(12) United States Patent
Rho

(10) Patent No.: US 9,411,471 B2
(45) Date of Patent: Aug. 9, 2016

(54) DISPLAY DEVICE WITH INTEGRATED TOUCH SCREEN PANEL AND FABRICATING METHOD THEREOF

(75) Inventor: Soo-Guy Rho, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 788 days.

(21) Appl. No.: 13/137,441

(22) Filed: Aug. 16, 2011

(65) Prior Publication Data

US 2012/0062486 A1  Mar. 15, 2012

(30) Foreign Application Priority Data

Sep. 14, 2010 (KR) .................. 10-2010-0089950

(51) Int. Cl.
| | |
|---|---|
| *G06F 3/041* | (2006.01) |
| *G06F 3/042* | (2006.01) |
| *G06F 3/045* | (2006.01) |
| *G09G 5/00* | (2006.01) |
| *G06F 3/044* | (2006.01) |

(52) U.S. Cl.
CPC ............... *G06F 3/044* (2013.01); *G06F 3/041* (2013.01); *B32B 2457/208* (2013.01); *G06F 2203/04103* (2013.01); *G06F 2203/04111* (2013.01); *Y10T 156/10* (2015.01)

(58) Field of Classification Search
CPC .................. G06F 3/041–3/042; G06F 3/0412; G06F 17/00; G06F 3/044; G06F 3/045; G09G 3/30; G09G 3/32; G09G 3/36; G09G 5/00; G09G 5/02; G02F 1/1333; G02F 1/1337; G02F 1/1339; G02F 1/1343
See application file for complete search history.

(56) References Cited

U.S. PATENT DOCUMENTS

| | | | | |
|---|---|---|---|---|
| 5,870,160 | A * | 2/1999 | Yanagawa et al. | 349/141 |
| 5,889,569 | A * | 3/1999 | Okamoto et al. | 349/110 |
| 2004/0114088 | A1* | 6/2004 | Murade | 349/155 |
| 2007/0070264 | A1* | 3/2007 | Fujita et al. | 349/61 |
| 2007/0170423 | A1* | 7/2007 | Choi et al. | 257/40 |
| 2008/0030491 | A1* | 2/2008 | Kim et al. | 345/207 |

(Continued)

FOREIGN PATENT DOCUMENTS

| | | |
|---|---|---|
| KR | 10-0258406 B1 | 3/2000 |
| KR | 10-2000-0065789 A | 11/2000 |

(Continued)

OTHER PUBLICATIONS

Korean Office Action dated Jun. 16, 2016.

*Primary Examiner* — Ilana Spar
*Assistant Examiner* — Nguyen H Truong
(74) *Attorney, Agent, or Firm* — Lee & Morse, P.C.

(57) ABSTRACT

A display device with an integrated touch screen panel includes upper and lower substrates each divided into a display area and a non-display area, which is provided outside of the display area and includes a sealing area. Pixels may be formed in the display area between the upper and lower substrates. A black matrix is formed on a bottom surface of the upper substrate and disposed in the display area and the non-display area. The black matrix is open in the sealing area. Sensing patterns may be formed in the display area on a top surface of the upper substrate. Sensing lines may be formed in the non-display area on the top surface of the upper substrate and connected to the sensing patterns along a first or second direction. A light-shielding pattern is formed to cover the sealing area of the non-display area on the top surface of the upper substrate.

21 Claims, 8 Drawing Sheets

(56) References Cited

U.S. PATENT DOCUMENTS

| | | | |
|---|---|---|---|
| 2009/0050808 A1* | 2/2009 | Ushimi et al. | 250/338.3 |
| 2009/0212808 A1* | 8/2009 | Yoshii | 324/763 |
| 2010/0110041 A1* | 5/2010 | Jang | 345/174 |
| 2010/0134747 A1* | 6/2010 | Tashiro et al. | 349/153 |
| 2010/0164881 A1* | 7/2010 | Kuo | G06F 3/044 345/173 |
| 2010/0182275 A1* | 7/2010 | Saitou | 345/174 |
| 2010/0188360 A1* | 7/2010 | Joung | G02F 1/13338 345/174 |
| 2010/0233930 A1* | 9/2010 | Ishida et al. | 445/24 |
| 2011/0007005 A1* | 1/2011 | Lee et al. | 345/173 |
| 2011/0018826 A1* | 1/2011 | Shoji | 345/173 |
| 2011/0134050 A1* | 6/2011 | Harley | 345/173 |

FOREIGN PATENT DOCUMENTS

| | | |
|---|---|---|
| KR | 10-0902211 B1 | 6/2009 |
| KR | 10-2010-0084260 A | 7/2010 |

* cited by examiner

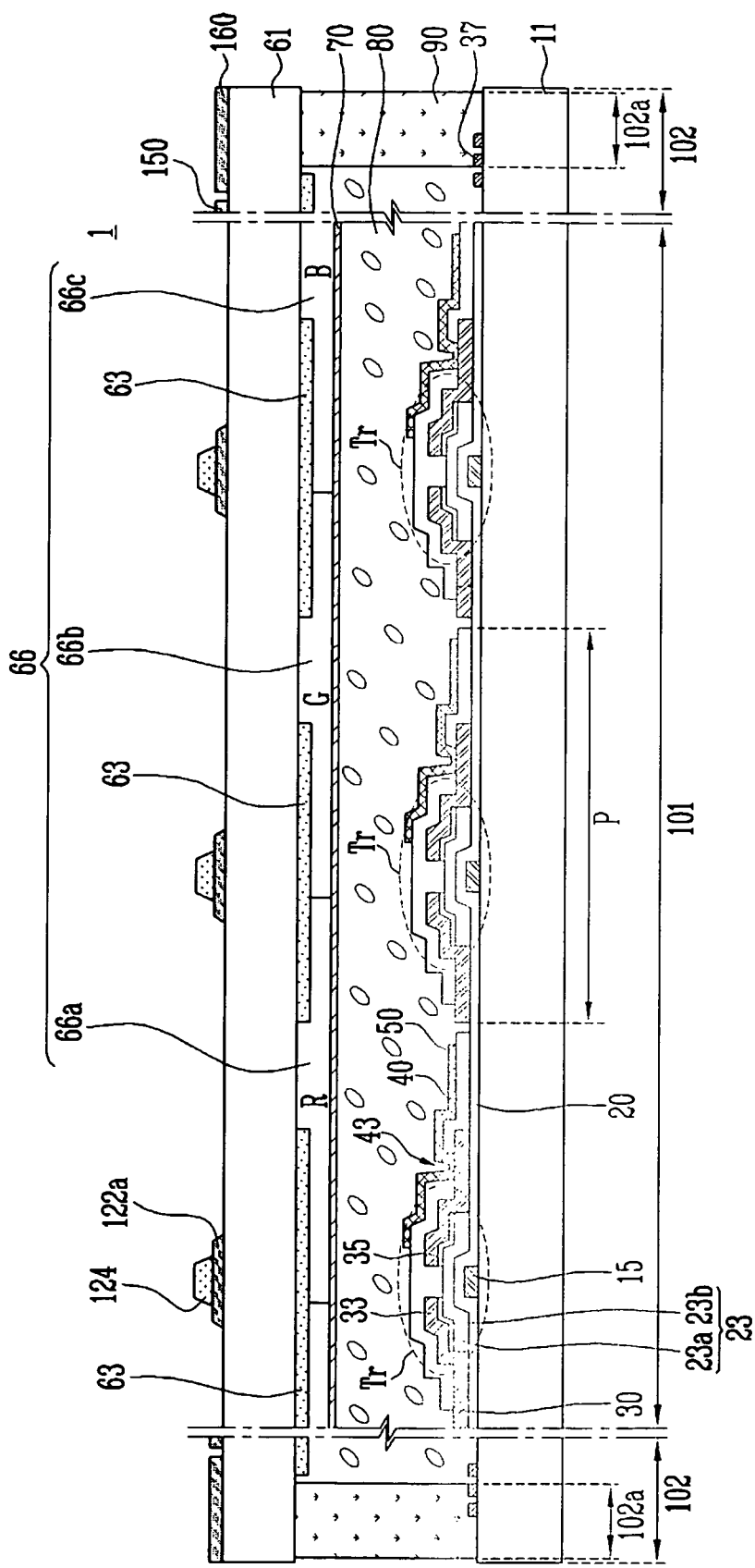

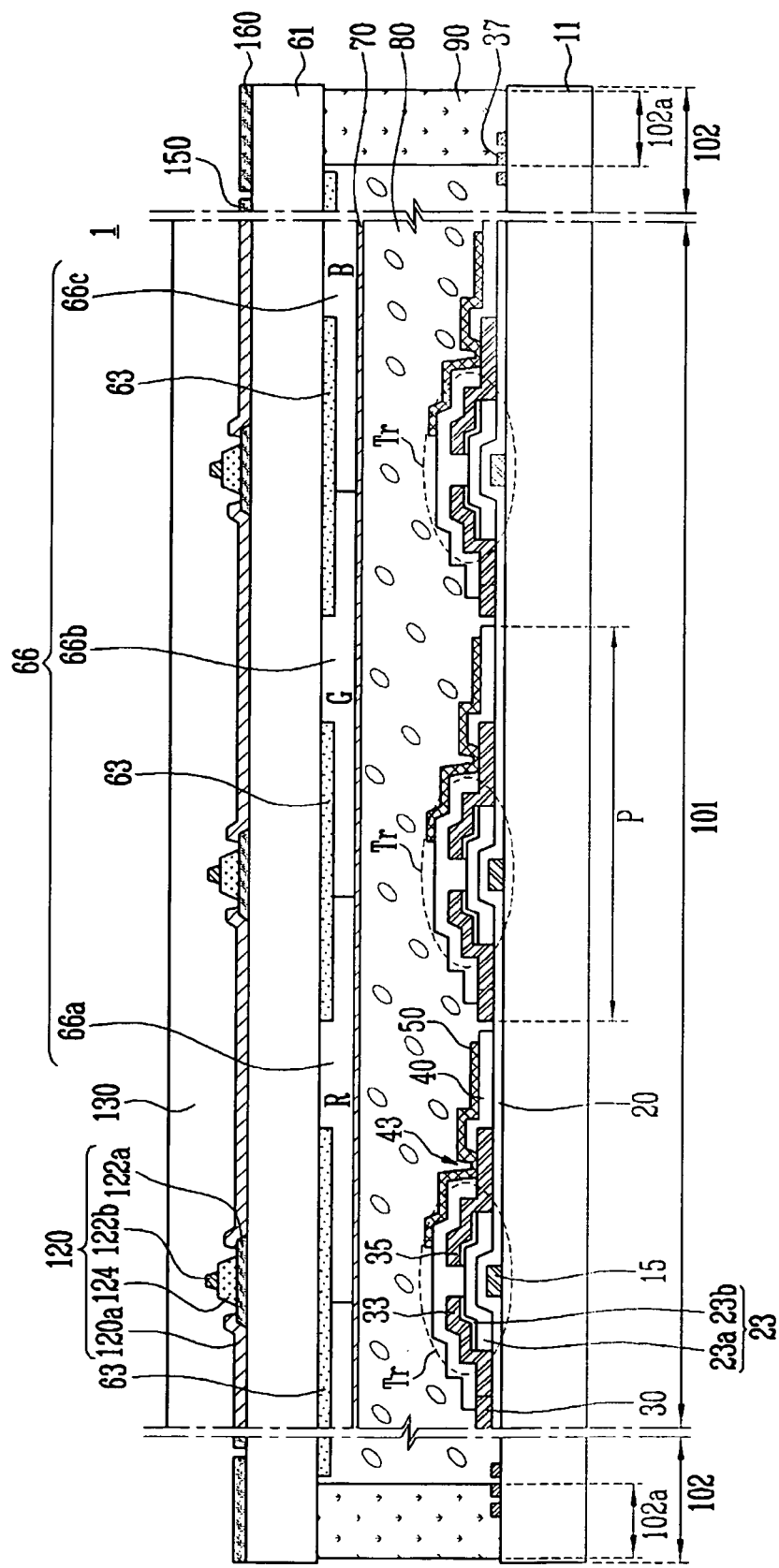

DISPLAY DEVICE WITH INTEGRATED TOUCH SCREEN PANEL AND FABRICATING METHOD THEREOF

BACKGROUND

1. Field

An aspect of the disclosure relates to a display device and a fabricating method thereof, and more particularly, to a display device with an integrated touch screen panel and a fabricating method thereof, in which sensing patterns for sensing a touch are directly formed on the top surface of an upper substrate in a display device such as a liquid crystal display device, thereby integrating a touch screen panel and a display panel.

2. Description of the Related Art

A touch screen panel is an input device that allows a user's instruction to be inputted by selecting an instruction content displayed on a screen of a display device such as a liquid crystal display device with a user's hand or object.

To this end, the touch screen panel is formed on a front face of the display device to convert a contact position into an electrical signal. Here, the user's hand or object is directly in contact with the touch screen panel at the contact position. Accordingly, the instruction content selected at the contact position is inputted as an input signal to the display device.

Since such a touch screen panel can be substituted for a separate input device connected to a display device, such as a keyboard or mouse, its application fields have been gradually extended.

SUMMARY

According to an embodiment, there is provided a display device with an integrated touch screen panel, the display device including upper and lower substrates each divided into a display area and a non-display area, the non-display area being at the outside of the display area and including a sealing area, a plurality of pixels in the display area between the upper and lower substrates, a black matrix on a bottom surface of the upper substrate and disposed in the display area between the pixels and the non-display area at the outside of the display area, the black matrix being open in the sealing area, a plurality of sensing patterns in the display area on a top surface of the upper substrate, a plurality of sensing lines in the non-display area on the top surface of the upper substrate and connected to the sensing patterns along a first or second direction, and a light-shielding pattern that covers the open black matrix in the sealing area of the non-display area on the top surface of the upper substrate.

The light-shielding pattern may include a same material as one or more components that constitute the sensing patterns or the sensing lines.

The light-shielding pattern may include a metal.

The sensing patterns may include a plurality of first sensing cells distributed in the display area and connected along the first direction; a plurality of second sensing cells distributed in the display area while being alternately arranged with the first sensing cells and connected along the second direction intersected with the first direction; first connection patterns that connect the first sensing cells along the first direction between the first sensing cells; and second connection patterns that connect the second sensing cells along the second direction between the second sensing cells.

One or more of the first and second connection patterns may include an opaque conductive material, and the light-shielding pattern may include same opaque conductive material as the connection patterns.

The sensing patterns may further include an organic insulating layer interposed at intersection portions of the first and second connection patterns.

The display device may further include a protection layer on at least the top surface of the upper substrate in the display area to cover the sensing patterns.

The display device may further include signal lines in the non-display area on the top surface of the upper substrate. In the signal lines, at least a portion of the signal lines may be positioned in the sealing area.

According to an embodiment, there is provided a fabricating method of a display device with an integrated touch screen panel, the method including: preparing a lower substrate divided into a display area having a plurality of pixels formed therein and a non-display area at the outside of the display area, the non-display area including a sealing area, forming a black matrix on a bottom surface of the upper substrate to correspond to the display area between the pixels and the non-display area at the outside of the display area, wherein the black matrix is open in an area corresponding to the sealing area, disposing one surface of the lower substrate having the pixels thereon and one surface of the upper substrate having the black matrix thereon to face each other, and joining the lower and upper substrates together using a sealing member provided to the lower or upper substrate at the sealing area, and forming a plurality of sensing patterns and sensing lines connected to the sensing patterns on a top surface of the upper substrate.

In the joining of the lower and upper substrates together, a laser may be irradiated onto the sealing member from a direction of the upper substrate through the sealing area in which the black matrix is open.

After the joining of the lower and upper substrates together is completed, the method may further include forming a light-shielding pattern on the top surface of the upper substrate to cover the sealing area.

In forming of the one or more of the sensing patterns and the sensing lines, a light-shielding pattern may be formed on the top surface of the upper substrate to cover the sealing area.

In the forming of the one or more of the sensing patterns and the sensing lines, the light-shielding pattern may be simultaneously formed with the sensing patterns and the sensing lines using the same material as a material used for the sensing patterns and the sensing lines.

After the joining of the lower and upper substrates, the method may further include performing a slimming process of the upper substrate prior to the forming of the sensing patterns and the sensing lines on the top surface of the upper substrate.

The method may further include forming a protection layer on the sensing patterns.

BRIEF DESCRIPTION OF THE DRAWINGS

The above and other features and advantages will become more apparent to those of ordinary skill in the art by describing in detail exemplary embodiments with reference to the attached drawings, in which:

FIGS. 4A to 4E illustrate sectional views sequentially illustrating a fabricating method of the display device with the integrated touch screen panel shown in FIG. 3.

DETAILED DESCRIPTION

Figure 1:
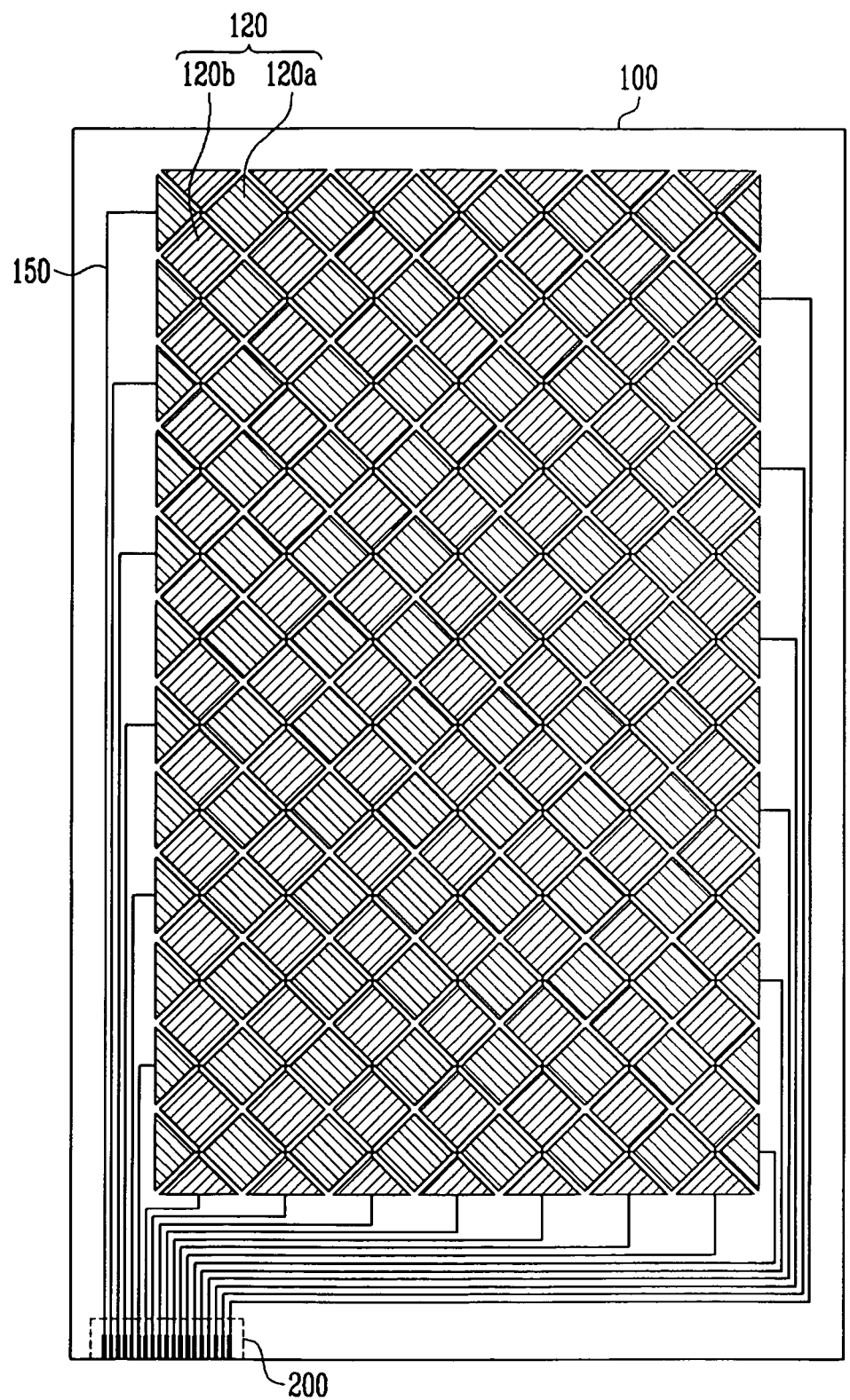
FIG. 1 illustrates a plan view schematically showing an example of a touch screen panel.

Korean Patent Application No. 10-2010-0089950, filed on Sep. 14, 2010, in the Korean Intellectual Property Office, and entitled: "Display Device with Integrated Touch Screen Panel and Fabricating Method Thereof" is incorporated by reference herein in its entirety.

In the following detailed description, only certain exemplary embodiments have been shown and described, simply by way of illustration. As those skilled in the art would realize, the described embodiments may be modified in various different ways, all without departing from the spirit or scope thereof. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter exemplary embodiments will be described in detail with reference to the accompanying drawings.

FIG. 1 illustrates a plan view schematically showing an example of a touch screen panel.

Referring to FIG. 1, the touch screen panel may include a transparent substrate 110; sensing patterns 120 formed in a touch active area on the transparent substrate 100; and sensing lines 150 formed in a non-touch active area formed at the outside of the touch active area to connect the sensing patterns 120 to an external driver circuit through a pad portion 200.

For example, the touch active area may be defined as a display area, and non-touch active area may be defined as a non-display area. Hereinafter, for convenience of illustration, it may be assumed that the touch active area and the non-touch active area are the display area and the non-display area, respectively.

The sensing patterns 120 include a plurality of first sensing cells 120a and a plurality of second sensing cells 120b. The plurality of first sensing cells 120a may be distributed on the display area of the transparent substrate 100 and electrically connected along a first direction (e.g., an X-direction). The plurality of second sensing cells 120b may be distributed between the first sensing cells 12a on the display area of the transparent substrate 100 and electrically connected along a second direction (e.g., a Y-direction).

The first sensing cells 120a and the second sensing cells 120b may be alternately arranged so that they may be connected along different directions from each other.

The first sensing cells 120a may be arranged for each group along the first direction, e.g., for each row line, and the second sensing cells 120b may be arranged for each group along the second direction, e.g., for each column line. The row lines of the first sending cells 120a and the column line of the second cells 120b may be connected to the sensing lines 150, respectively.

The first and second sensing cells 120a and 120b may be formed of a transparent electrode material such as indium tin oxide (ITO) so that light incident from a display panel (not shown) disposed below the touch screen panel can be transmitted therethrough.

Although only simple lines are shown in FIG. 1 to represent connections of first sensing cells 120a to each other and the second sensing cells 120b to each other without designating reference numerals, a plurality of first connection patterns and a plurality of second connection patterns may be further formed in the display area on the transparent substrate 100. The plurality of first connection patterns may be arranged along the first direction between the first sensing cells 120a to connect the first sensing cells 120a to one another along the first direction. The plurality of second connection patterns may be arranged along the second direction between the second sensing cells 120b to connect the second sensing cells 120b to one another along the first direction. Embodiments of the connection patterns and third detailed descriptions will be described below.

The sensing lines 150 may be formed in the non-display area to be connected to the sensing patterns 120 along the first or second directions.

The sensing lines 150 may be used to connect the first sensing cells 120a and the second sensing cells 120b to an external driver circuit for each line along the first and second directions. For example, the respective sensing lines 150 may be electrically connected to the row lines of the first sensing cells 120a and the column lines of the second sensing cells 120b, so that the first and second sensing cells 120a and 120b may be connected to an external driver circuit (not shown) such as a position detecting circuit through the pad portion 200.

The sensing lines 150 may be arranged in the non-display area that is an outer portion of the touch screen panel outside of the display area in which images are displayed. A wide range of materials may be selected for the sensing lines 150. Therefore, the sensing lines 150 may be formed of not only a transparent electrode material used to form the sensing patterns 120 but also a low-resistance metallic material such as molybdenum (Mo), silver (Ag), titanium (Ti), copper (Cu), aluminum (Al) or Mo/Al/Mo.

The touch screen panel configured as described above is disclosed as an example of the capacitive touch screen panel. If a contact object such as a user's finger or stylus pen comes in contact with the touch screen panel, a change in capacitance caused by a contact position is transferred from the sensing patterns 120 to the driver circuit (not shown) via the sensing lines 150 and the pad portion 200. Then, the change in capacitance may be converted into an electrical signal by X and Y input processing circuits (not shown), such that the contact position may be thereby detected.

Figure 2:
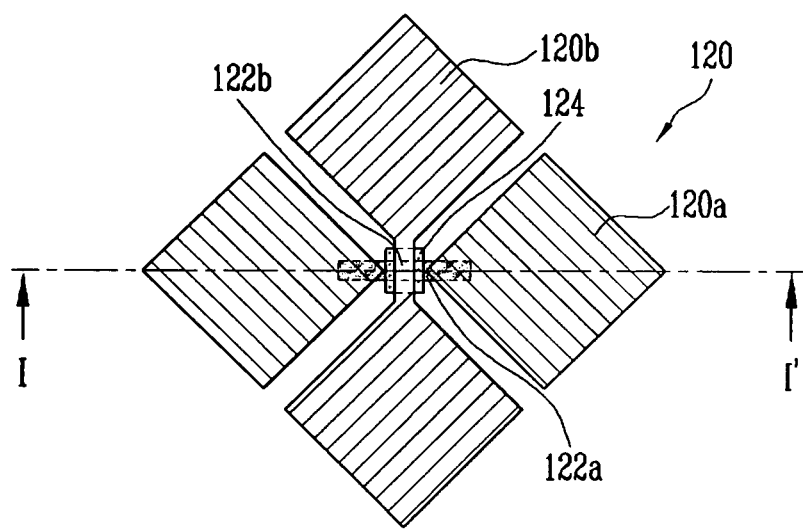
FIG. 2 illustrates a plan view showing an example of sensing patterns according to FIG. 1.

FIG. 2 illustrates a plan view showing an example of the sensing patterns shown in FIG. 1. For convenience of illustration, two adjacent first sensing cells, two adjacent second sensing cells, a first connection pattern for connecting the first sensing cells and a second connection pattern for connecting the second sensing cells are shown in FIG. 2. However, in the touch screen panel, a plurality of the sensing patterns may be distributively arranged as repeated patterns on the display area. Therefore, in the following description, a plurality of connection patterns will be represented as well as the sensing cells.

Referring to FIG. 2, the sensing patterns 120 include first sensing cells 120a connected along the first direction; second sensing cells alternately arranged with the first sending cells 120a and connected along the second direction; first connection patterns 122a to connect the first sensing cells 120a along the first direction between the respective first sensing cells 120a; second connection patterns 122b to connect the second sensing cells 120b along the second direction between the respective second sensing cells 120b; and an insulating layer 124 interposed between the first and second connection patterns 122a and 122b.

The first and second sensing cells 120a and 120b may be formed by patterning a transparent electrode material such as ITO. The first connection patterns 122a and/or the second connection patterns 122b may be formed of a same transparent electrode material as the first and second sensing cells 120a and 120b, or may be formed of an opaque conductive material. The width, thickness or length of the first connection patterns 122a and/or the second connection patterns 122b may be adjusted to prevent the first connection patterns 122a and/or the second connection patterns 122b from being visible.

For example, like the sensing lines 150 shown in FIG. 1, the first connection patterns 122a may be formed of an opaque conductive material (e.g., metal) so as to be connected to the first sensing cells 120a in an upper or lower layer of the first sensing cells 120a through direct/indirect contact with the first sensing cells 120a. The second connection patterns 122b may be formed to be integrally patterned with the second sensing cells 120b by using the same transparent electrode material as the first and second sensing cells 120a and 120b.

The insulating layer 124 for ensuring security (insulation property) between the first and second connection patterns 122a and 112b is interposed at intersection portions of the first and second connection patterns 122a and 112b. The insulating layer 124 may be easily grown to have a predetermined thickness, and may be formed of an organic insulating material applicable to a low-temperature process, or the like. In this case, it may be possible to secure a sufficient spacing distance between the first and second connection patterns 122a and 112b.

Figure 3:
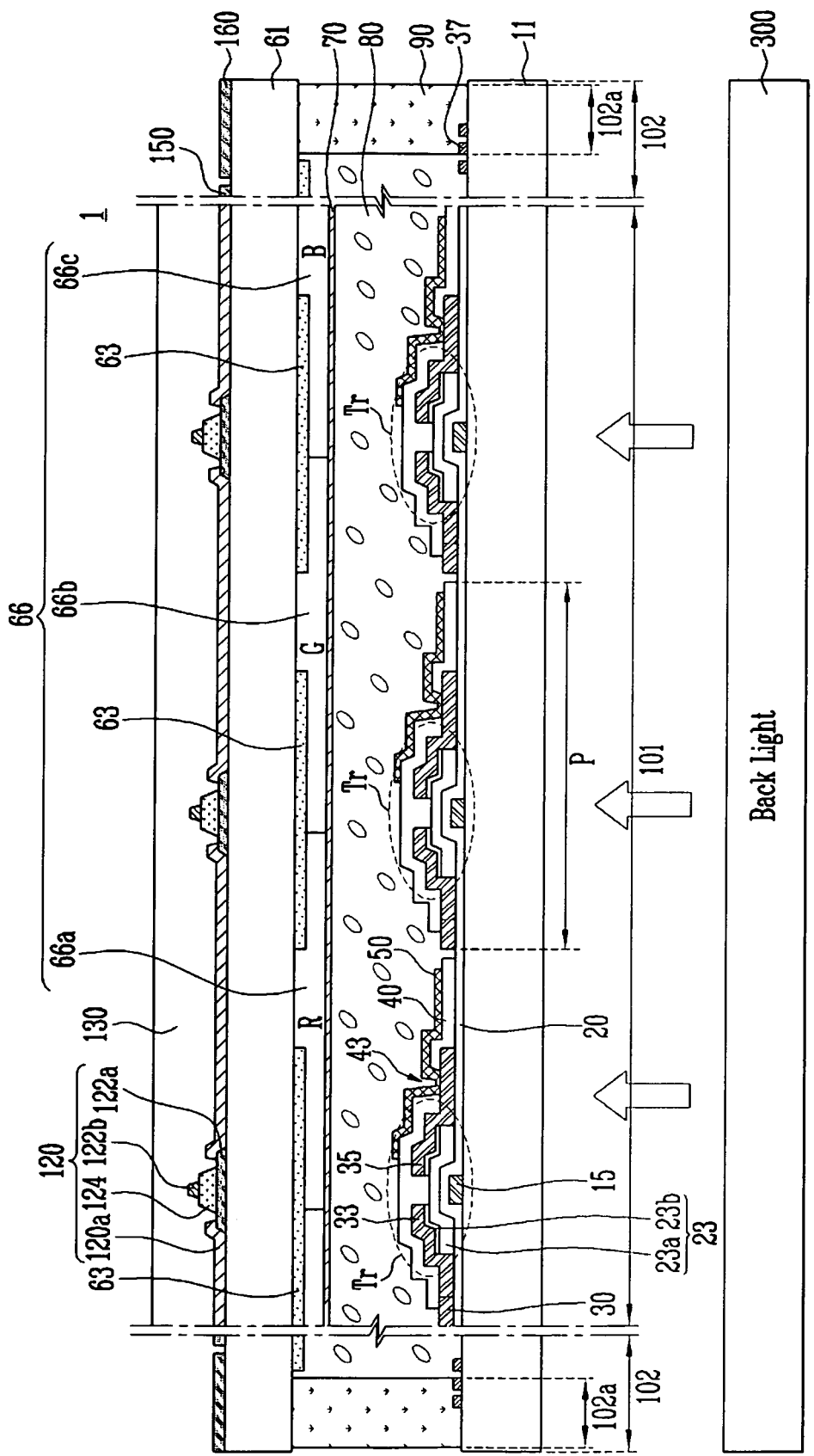
FIG. 3 illustrates a main-part sectional view showing a display device with an integrated touch screen panel according to an embodiment.

FIG. 3 illustrates a main-part sectional view showing a display device with an integrated touch screen panel according to an embodiment.

Referring to FIG. 3, in the display device 1 with the integrated touch screen panel according to this embodiment, a plurality of pixels P may be formed between lower and upper substrates 11 and 61 joined together so as to provide a display panel, and sensing patterns 120 that sense a touch may be formed on the top surface of the upper substrate 61 so as to provide a touch screen panel. Thus, the display panel and the touch screen panel may be integrally provided.

FIG. 3 shows a liquid crystal display device as an example of the display device, in which a liquid crystal layer 80 in which the array direction of molecules may be changed by the voltage between the pixel electrodes 50 and the common electrode 70 may be interposed between pixel electrodes 50 provided to the lower substrate 11 and a common electrode 70 provided to the upper substrate 61. However, the example of a liquid crystal display device is provided only for illustrative purposes, and the display device according to this embodiment is not necessarily limited to the liquid crystal display device but may be applied to another display device such as an organic light emitting display device.

Hereinafter, the configuration of the display device 1 with the integrated touch screen panel shown in FIG. 3 will be described in a more detailed manner. The display device 1 with the integrated touch screen panel has a configuration in which a lower substrate 11 as an array substrate and an upper substrate 61 as a color filter substrate may be joined together to face each other with the liquid crystal layer 80 interposed therebetween. A plurality of sensing patterns 120 and sensing lines 150 that sense a touch may be formed on the top surface of the upper substrate 61.

A display area 101 and a non-display area 102 may be partitioned in each of the lower and upper substrates 11 and 61. The non-display area is provided at the outside of the display area 101 and may include a sealing area 102a. For example, the term "outside of the display area" may refer to an outer peripheral area surrounding the display area. The display and non-display areas 101 and 102 of the lower substrate 11 may correspond to those of the upper substrate 61.

A plurality of pixels P including pixel electrodes 50 and a common electrode 70 may be formed in the display area 101 between the lower and upper substrates 11 and 61.

A plurality of gate lines (not shown) and a plurality of data lines 30, which are vertically and horizontally arranged to intersect each other, may be formed on the top surface of the lower substrate 11. A thin film transistor Tr is provided at the intersection portion of the gate and data lines so as to be connected to the pixel electrode 50 formed in each of the pixels P.

Although not shown in FIG. 3, storage lines (not shown) may be alternately arranged between the gate lines (not shown) so as to transfer a sustain signal to each of the pixels P. In this instance, the gate and storage lines may be arranged in a first direction (e.g., an X-axis direction), and the data lines 30 may be arranged in a second direction (e.g., a Y-axis direction) intersected with the first direction.

The thin film transistor Tr may include a gate electrode 15 connected to the gate line (not shown); source/drain electrodes 33 and 35 formed in an upper or lower layer of the gate electrode 15; and a semiconductor layer 23 formed between the gate electrode 15 and the source/drain electrode 33 and 35. Here, the semiconductor layer 23 may include an active layer 23a and an ohmic contact layer 23b.

A gate insulating layer 20 may be formed between the gate electrode 15 and the semiconductor layer 23, and a protection layer 40 may be formed on the source/drain electrodes 33 and 35. A contact hole 43 that exposes an area of the source electrode 35 may be provided to the protection layer 40.

A pixel electrode 50 connected to the source electrode 35 through the contact hole 43 may be formed on the protection layer 40. The pixel electrode 50 receives a data signal supplied from the thin film transistor Tr.

A black matrix 63, a color filter 66 and a common electrode 70 may be formed on the bottom surface of the upper substrate 61 opposite to the lower substrate 11, i.e., on a surface of the upper substrate 61 that faces the lower substrate 11.

The black matrix 63 may be formed in the shape of a lattice that surrounds each of the pixels P to cover an area in which the lines, the thin film transistors Tr or the like are formed. That is, black matrix 63 may be formed on the bottom surface of the upper substrate 61. In the display area 101, the black matrix 63 may be disposed between the pixels P, e.g., at a line portion or circuit device portion. In the non-display area 102, the black matrix 63 may be disposed in a shape that surrounds the outline of the display area 101. However, in this embodiment, at least one area of the black matrix 63 may include an opening in the sealing area 102a.

The at least one area of the black matrix 63 may include an opening in the sealing area 102a so that a laser (e.g., a laser for curing such as a UV laser) or the like may be irradiated onto a sealing member 90 from the direction of the upper substrate 61 so as to join the lower and upper substrates 11 and 61 together. In this case, since the laser is not necessarily transmitted to the lower substrate 11, signal lines 37, driver circuits or the like may be densely positioned in the sealing area 102a on the top surface of the lower substrate 11.

In the display device 1 according to this embodiment, at least a portion of the signal lines 37 or the driver circuits that may be disposed in the non-display area 102 on the top surface of the lower substrate 11 and may also be positioned in the sealing area 102a. It may be unnecessary to secure an opening ratio for laser transmission. Accordingly, it may not be necessary to ensure a spacing distance between the signal lines 37. The degree of circuit integration may be enhanced. Accordingly, it may be possible to reduce dead spaces.

In the fabrication of the display device 1 with the integrated touch screen panel according to this embodiment, the process of joining the lower and upper substrates 11 and 61 together may be performed before the sensing patterns 120, the sensing lines 150, a light-shielding pattern 160 and the like are formed on the top surface of the upper substrate 61.

After the process of joining the lower and upper substrates 11 and 61 together is completed, the sensing patterns 120, the sensing lines 150, the light-shielding pattern 160 and the like may be formed on the top surface of the upper substrate 61.

A color filter 66 and a common electrode 70 may be sequentially formed on the bottom surface of the upper substrate 61 having the black matrix 63 formed thereon.

The color filter 66 may include red, green and blue color filter patterns 66a, 66b and 66c sequentially and repeatedly arranged to correspond to the respective pixels P.

The common electrode 70 may be formed over the entire display area 101 on one surface (bottom surface) of the upper substrate 61, on which the black matrix 63 and the color filter 66 are formed. The common electrode 70 may be formed of a transparent electrode material so that light incident from the lower portion thereof may pass through.

An overcoat layer (not shown) may be further formed between the color filter 66 and the common electrode 70.

The liquid crystal layer 80 may be injected between the lower substrate 11 having the pixel electrodes 50 formed thereon and the upper substrate 61 having the common electrode 70 formed thereon. Accordingly, a liquid crystal capacitor may be produced, in which the pixel electrode 50 and the common electrode 70 may be used as two terminals, and the liquid crystal layer 80 between the pixel electrode 50 and the common electrode 70 may be used as a dielectric layer.

The sensing patterns 120 may be formed in the display area 101 on the top surface of the upper substrate 61, and the sending lines 150 and the light-shielding pattern 160 may be formed in the non-display area 102 on the top surface of the upper substrate 61.

The sensing patterns 120 shown in FIG. 3 show sections taken along line I-I' of FIG. 2. The sensing patterns 120 include first and second sensing cells 120a and 120b, first and second connection patterns 122a and 122b, and an insulating layer 124. Here, the detailed configuration of the sensing patterns 120 has been previously described with reference to FIGS. 1 and 2, and therefore, their detailed descriptions will not be repeated here.

In this embodiment, the sensing patterns 120 may be formed on the top surface of the upper substrate 61 completely joined together with the lower substrate 11 by the sealing member 90. The process of forming the sensing patterns 120 may be performed so that the lower elements are not damaged. For example, a metal layer growing process to form the first connection patterns 122a and the like may be performed in a low-temperature low-vacuum state, and the insulating layer may be patterned at a low temperature using a photo-curable epoxy material, and the like.

As described above, if the sensing patterns 120 are formed on the upper substrate 61 after the fabrication of a display panel is completed by the process of joining the lower and upper substrates 11 and 61 together, it may be possible to prevent the sensing patterns 120 from being damaged due to the inflow of static electricity in the joining process, and the like, as compared with a comparative example in which after the sensing patterns 120 are formed on one surface of the upper substrate 61, the black matrix 63, the color filter 66 and the common electrode 70 are formed on the other surface of the upper substrate 61 using the one surface on which the sensing patterns 120 are formed as a rear surface, and the lower and upper substrates 11 and 61 are then joined together. Accordingly, it may be possible to ensure the reliability of the touch screen panel and to improve the yield of the touch screen panel.

IA protection layer 130 may be formed in at least the display area 101 to cover the sensing patterns 120. For example, the protection layer 130 may be formed of an organic insulating layer so that it may be possible to reduce stress due to an external impact and to prevent scratches or the like.

The sensing lines 150 may be formed in the non-display area 102 on the top surface of the upper substrate 61. A wide range of material may be selected for the sensing lines 150. For example, the sensing lines may be formed of a low-resistance opaque metallic material.

The light-shielding pattern 160 may be formed on the top surface of the upper substrate 61 completely joined together with the lower substrate 11 so as to prevent light leakage (e.g., light leakage from the part of a back light 300). The black matrix 63 may include an opening in the sealing area 102a so that a laser can be irradiated from the direction of the upper substrate 61 in the process of joining the lower and upper substrates 11 and 61 together.

The light-shielding pattern 160 may be formed in the non-display area 102 on the top surface of the upper substrate 61 so that the light-shielding pattern 160 covers the opening of the black matrix 63 in the sealing area 102a.

In the process of forming the sensing patterns 120 and/or the sensing lines 150, the light-shielding pattern 160 may be formed using the same material as the sensing patterns 120 and/or the sensing lines 150 so as to simplify the process.

That is, the light-shielding pattern 160 may be formed of the same material as the sensing lines 150 and/or one or more components that constitute the sensing patterns 120. For example, the first connection patterns 122a may formed of an opaque conductive material such as metal instead of being formed of a transparent electrode material.

Accordingly, the light-shielding pattern 160 may be formed of a metal, like the first connection patterns 122a and the sensing lines 150.

The light-shielding pattern 160 may be formed of a metal pattern in consideration of the efficiency on the fabrication. The material of the light shielding pattern 160 is not necessarily limited to the same material as the sensing patterns 120 and/or the sensing lines 150. It will be apparent that the light-shielding pattern 160 may be formed of another material capable of preventing light leakage.

As described above, according to this embodiment, the process of joining the lower and upper substrates 11 and 61 together may be performed providing an opening in the black matrix 63 formed on the upper substrate 61 in the sealing area 102 and irradiating laser to be transmitted through the upper substrate 61 to reach the sealing member 90. Subsequently, the sensing patterns 120 and the sensing lines 150 may be formed on the top surface of the upper substrate 61, and the light-shielding pattern 160 may be formed to cover the sealing area 102 having opening in the black matrix 63 therein.

Accordingly, the signal lines 37, the driving circuits or the like may be densely arranged in the sealing area 102a on the top surface of the lower substrate 11, so that it may be possible to reduce dead spaces. Also, the sensing patterns 120 formed on the upper substrate 61 may be prevented from being damaged in the process of joining the upper substrate 61 and the lower substrate 11, so that it may be possible to improve the reliability and yield of the touch screen panel. In addition, the light leakage from the back light 300 and the like can be effective prevented by the light-shielding pattern 160.

FIGS. 4A to 4E illustrate sequential sectional views relating to a fabricating method of the display device with the integrated touch screen panel shown in FIG. 3. For convenience of illustration, detailed descriptions of FIGS. 4A to 4E that overlap with those of FIGS. 1 to 3 will be omitted.

Figure 4A:
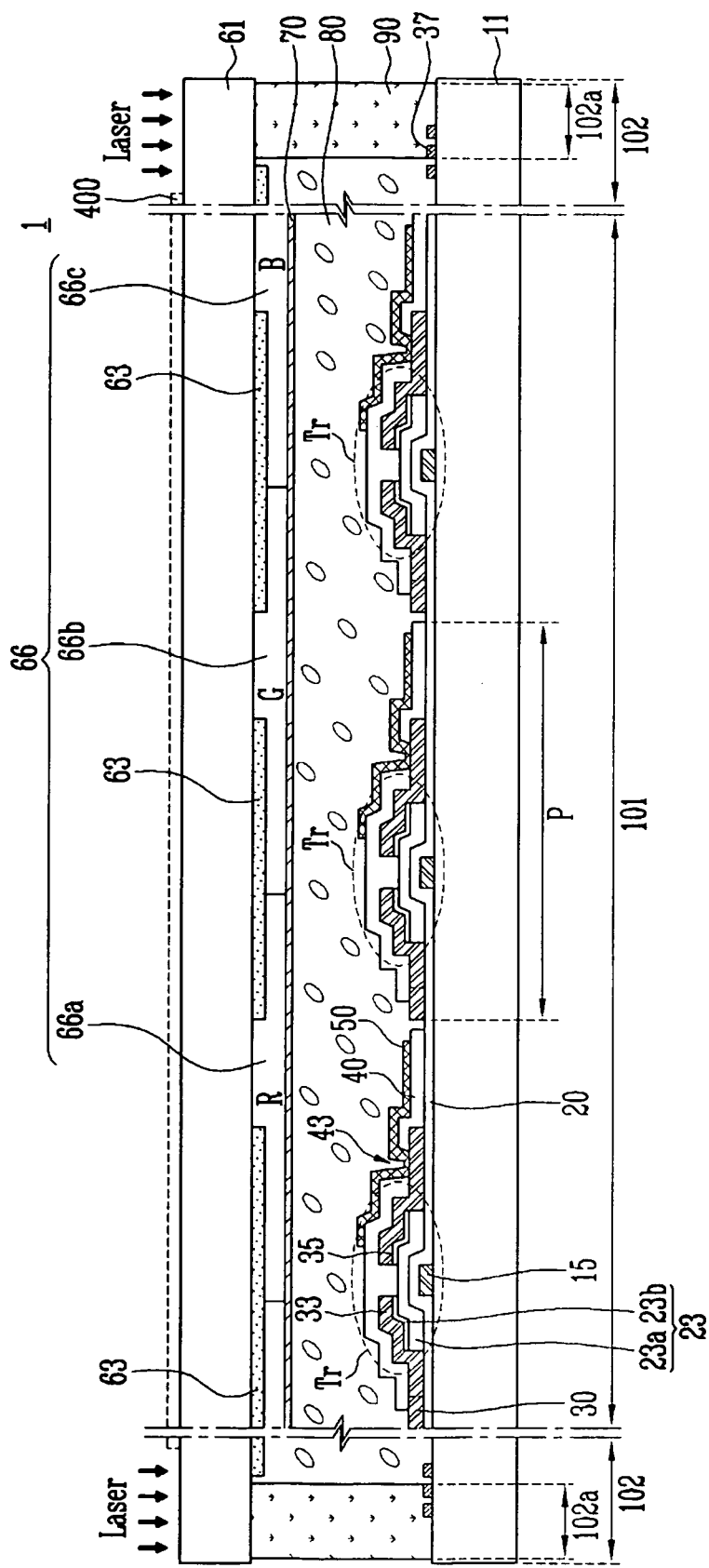

Referring to FIG. 4A, a lower substrate 11 divided into a display area 101 and a non-display area 102 may be prepared. The display area 101 has a plurality of pixels P (in the case of a liquid crystal display device, thin film transistors Tr, pixel electrodes 50 and the like) formed therein. The non-display area 102 may be defined at the outside of the display area 101 so that signal lines 37 and the like are arranged. The non-display area 102 may include a sealing area 102a.

In addition, an upper substrate 61 may be prepared, in which a black matrix 63 may be formed to correspond to the display area 101 between the pixels P and the non-display area 102 at the outside of the display area 101. The black matrix 63 may be provided with an opening corresponding to the sealing area 102a. A color filter 66 and a common electrode 70 may be sequentially formed on one surface of the upper substrate 61.

A sealing member 90 may be previously coated in at least one sealing area 102a of the lower and upper substrates 11 and 61.

Subsequently, one surface (top surface) of the lower substrate 11 having the pixels P formed thereon and one surface (bottom surface) of the upper substrate 61 having the black matrix 63 formed thereon may be disposed to face each other, and the lower and upper substrates 11 and 61 may be joined together by the sealing member 90 provided to the sealing area 102a.

In the process of joining the upper and lower substrates 11 and 61 together, the two substrates 11 and 61 may be adhered by irradiating a laser such as UV laser onto the sealing member 90 and curing the sealing member 90. Particularly, in this embodiment, the laser may be irradiated onto the sealing member 90 from the direction of the upper substrate 61 through the opening of the black matrix 63 and through the sealing area 102a.

The laser may be transmitted through the upper substrate 61 in the sealing area 102a and then reaches the sealing member 90. The display area 101 may be covered by a mask 400.

Meanwhile, in a case where the display device may be a liquid crystal display device, the process of joining the lower and upper substrates 11 and 61 together may include injecting a liquid crystal layer 80 between the two substrates 11 and 61. Also, a slimming process to decrease the thickness of the upper substrate 61 and the like may be additionally performed according to a design condition or the like.

If the slimming process of the upper substrate 61 is performed, sensing patterns can be formed using alignment marks of the thin film transistors Tr or the color filter 66 in a subsequent process of forming the touch screen panel, thereby ensuring the degree of alignment accuracy.

If the aforementioned process of forming the display panel is completed, the process of forming the touch screen panel may be subsequently performed to form a plurality of sensing patterns and sensing lines connected to the plurality of sensing patterns on the top surface of the upper substrate 61.

Figure 4B:
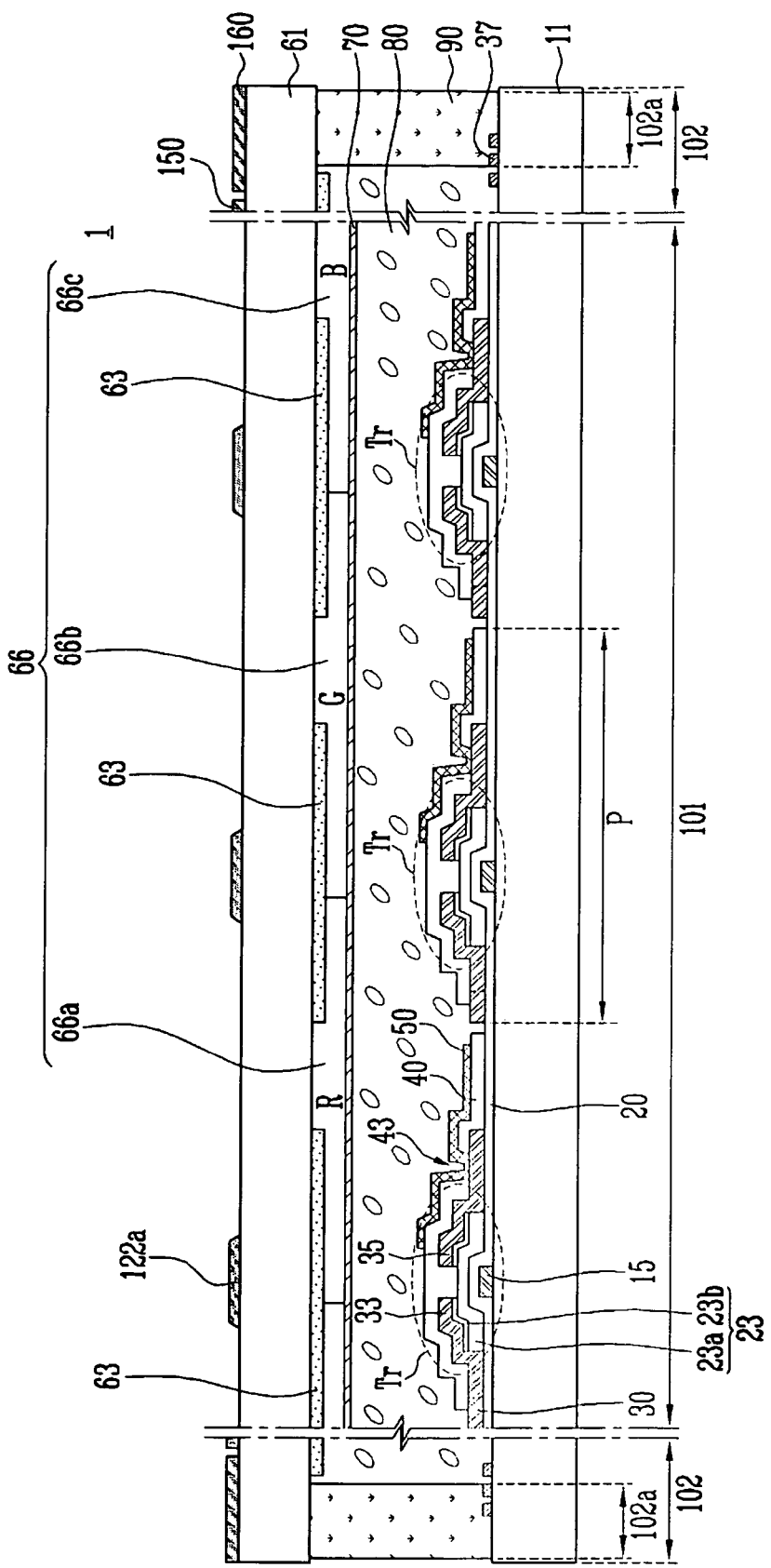

To this end, as shown in FIG. 4B, an opaque conductive material such as metal may be grown on the top surface of the upper substrate 61 under a low-temperature low-vacuum condition and then patterned, thereby forming first connection patterns 122a, sensing lines 150 and a light-shielding pattern 160.

Here, the light-shielding pattern 160 may be formed to sufficiently cover the area in which the black matrix 63 may include an opening in the non-display area 102, particularly in the sealing area 102a, so that light leakage can be effectively prevented.

In this embodiment, the first connection patterns 122a, the sensing lines 150 and the light-shielding pattern 160 may be simultaneously formed using the same material so as to enhance fabrication efficiency. However, the embodiments are not limited thereto. That is, at least one of the first connection patterns 122a, the sensing patterns 150 and the light-shielding pattern 160 may be formed of a different material in a different process from the other patterns.

Subsequently, as shown in FIG. 4C, an insulating layer 124 may be formed on the first connection patterns 122a. In this case, the insulating layer 124 may be formed to expose contact areas with the first sensing cells in a region of the first connection patterns 122a, particularly in a subsequent process.

In this instance, the insulating layer 124 may be formed of an organic insulating layer. Particularly, the insulating layer 124 may be patterned at a low temperature using a photo-curable epoxy material. For example, the insulating layer 124 may be formed using a material amenable to organic layer photo-curing at 130° C. or lower.

Figure 4D:
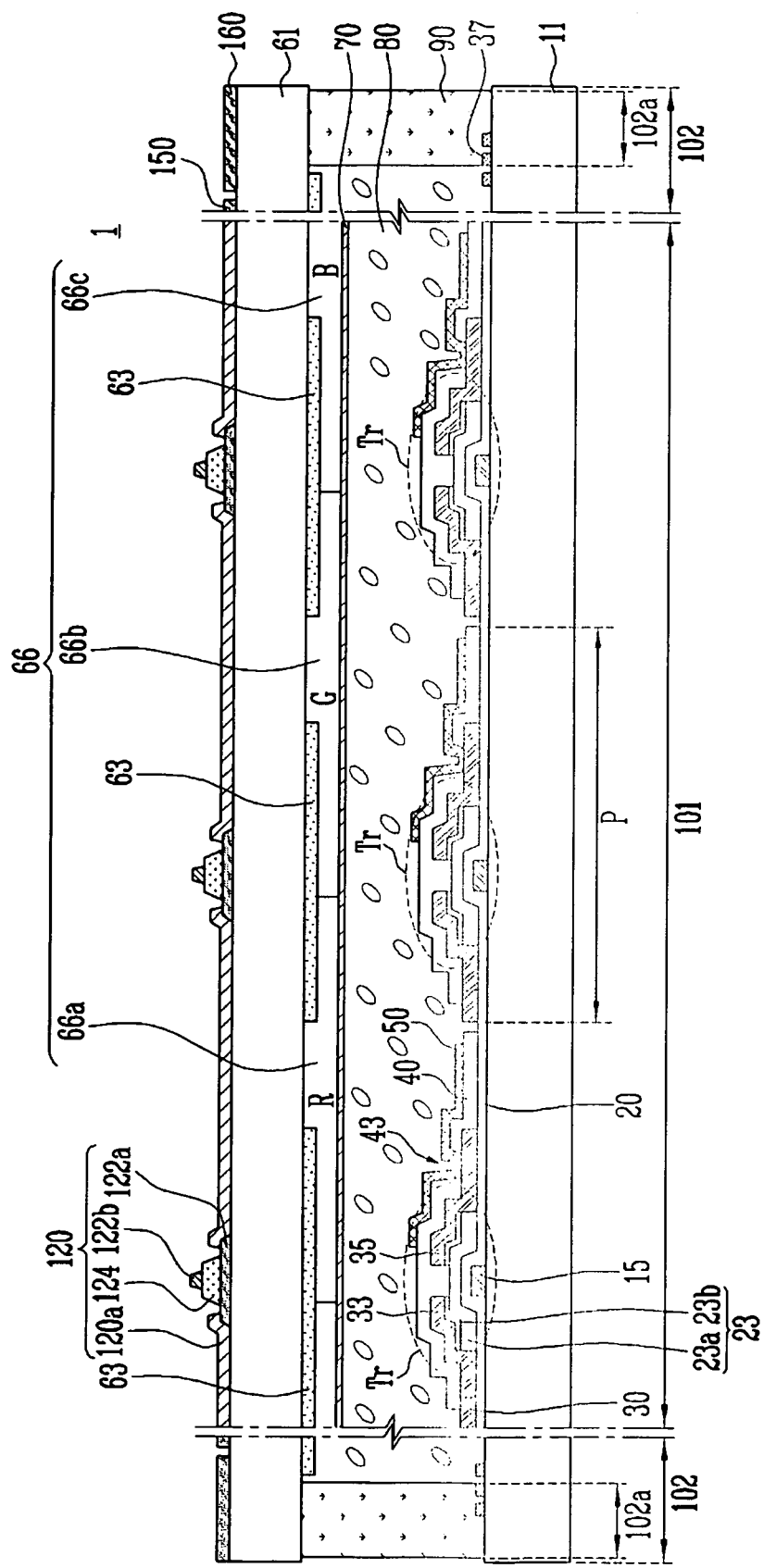

Subsequently, as shown in FIG. 4D, a transparent electrode material may be grown on the top surface of the upper substrate 61 on the first connection patterns 122a, the insulating layer 124 and the like may be formed, and then patterned, thereby forming sensing patterns 120 including first sensing cells 120a, second sensing cells (120b of FIG. 2) and second connection patterns 122b.

Subsequently, as shown in FIG. 4E, a protection layer 130 may be additionally formed entirely on at least the sensing patterns 120.

As described above, in a display device with an integrated touch screen panel and a fabricating method thereof according to embodiments, sensing patterns for sensing a touch may be formed on the top surface of an upper substrate that constitutes a display panel, thereby integrating the touch screen panel and the display panel. Accordingly, it may be possible to decrease the thickness of the display device with the integrated touch screen panel and to improve visibility of images.

Also, after a process of joining upper and lower substrates is performed by opening a black matrix formed on the upper substrate in a sealing area and irradiating laser to be transmitted to the upper substrate and then reach a sealing member, sensing patterns and sensing lines may be formed on the top surface of the upper substrate, and a light-shielding pattern may be formed to cover the opening of the black matrix in the sealing area.

Accordingly, signal lines, driving circuits or the like can be densely arranged in the sealing area of the lower substrate, thereby decreasing dead spaces. Further, it may be possible to prevent the sensing patterns formed on the upper substrate from being damaged in a process, thereby improving the reliability and yield of the touch screen panel. Furthermore, the light-shielding pattern may be provided, thereby effectively preventing light leakage.

As described above, the present embodiments address certain disadvantages, such as if a touch screen panel is separately fabricated and then attached to an outer face of a display device, the entire thickness of the display device may increased, and the visibility of an image may be degraded due to the space between the touch screen panel and the display device. Further, processing time and fabrication cost may be increased.

Embodiments provide a display device with an integrated touch screen panel and a fabricating method thereof, in which a touch screen panel and a display panel may be integrated with each other, so that it may be possible to decrease the thickness of the display device, to ensure the stability of patterns for implementing the touch screen panel and to reduce dead spaces.

While various aspects have been described in connection with certain exemplary embodiments, it is to be understood that the disclosure is not limited to the described embodiments, but, on the contrary, is intended to cover various modifications and equivalent arrangements included within the spirit and scope of the appended claims, and equivalents thereof.

What is claimed is:

1. A display device with an integrated touch screen panel, the display device comprising:
    upper and lower substrates each divided into a display area and a non-display area, the non-display area being at the outside of the display area and including a sealing area;
    a plurality of pixels in the display area between the upper and lower substrates;
    a black matrix on a bottom surface of the upper substrate and disposed in the display area between the pixels as a first black matrix for the display area and in the non-display area at the outside of the display area as a second black matrix for the non-display area, the black matrix being open in the sealing area;
    a plurality of sensing patterns formed on a top surface of the upper substrate in the display area;
    a plurality of sensing lines in the non-display area on the top surface of the upper substrate and connected to the sensing patterns along a first or second direction; and
    a light-shielding pattern that covers the open black matrix in the sealing area of the non-display area on the top surface of the upper substrate, wherein
    the first black matrix for the display area and the second black matrix for the non-display area are a same layer, and are formed of a same material, wherein
    the light-shielding pattern overlaps the second black matrix, and wherein
    the light-shielding pattern is adjacent to at least one of the plurality of sensing lines on a same plane, and is spaced apart from the at least one of the plurality of sensing lines on the same plane.

2. The display device as claimed in claim 1, wherein the light-shielding pattern is formed of a same material as the plurality of sensing patterns.

3. The display device as claimed in claim 1, wherein the light-shielding pattern includes metal.

4. The display device as claimed in claim 1, wherein the sensing patterns comprise:
    a plurality of first sensing cells distributed in the display area and connected along the first direction;
    a plurality of second sensing cells distributed in the display area while being alternately arranged with the first sensing cells and connected along the second direction intersected with the first direction;
    first connection patterns that connect the first sensing cells along the first direction between the first sensing cells; and
    second connection patterns that connect the second sensing cells along the second direction between the second sensing cells.

5. The display device as claimed in claim 4, wherein one or more of the first and second connection patterns include an opaque conductive material, and the light-shielding pattern includes the same opaque conductive material as the connection patterns.

6. The display device as claimed in claim 4, wherein the sensing patterns further include an organic insulating layer interposed at intersection portions of the first and second connection patterns.

7. The display device as claimed in claim 1, further comprising a protection layer on at least the top surface of the upper substrate in the display area to cover the sensing patterns.

8. The display device as claimed in claim 1, further comprising signal lines in the non-display area on the top surface of the upper substrate, wherein at least a portion of the signal lines is positioned in the sealing area.

9. The display device as claimed in claim 1, wherein the light-shielding pattern, the plurality of sensing lines, and the plurality of sensing patterns are directly on the top surface of the upper substrate.

10. The display device as claimed in claim 2, wherein the light-shielding pattern is formed of a same material as the plurality of sensing lines.

11. The display device as claimed in claim 1, further comprising a sealing member in the sealing area, the sealing member for joining the upper substrate and the lower substrate together, wherein
    the second black matrix for the non-display area is spaced apart from the sealing member such that the second black matrix for the non-display area does not overlap the sealing member.

12. The display device as claimed in claim 9, wherein the black matrix is formed directly on the bottom surface of the upper substrate.

13. A fabricating method of a display device with an integrated touch screen panel, the method comprising:
    preparing a lower substrate divided into a display area having a plurality of pixels formed therein and a non-display area at the outside of the display area, the non-display area including a sealing area;
    forming a black matrix on a bottom surface of the upper substrate to correspond to the display area between the pixels as a first black matrix for the display area and the non-display area at the outside of the display area as a second black matrix for the non-display area, wherein the black matrix is open in an area corresponding to the sealing area;
    disposing one surface of the lower substrate having the pixels thereon and one surface of the upper substrate having the black matrix thereon to face each other, and joining the lower and upper substrates together using a sealing member provided to the lower or upper substrate at the sealing area;
    forming a plurality of sensing patterns on a top surface of the upper substrate and forming sensing lines connected to the sensing patterns, and
    forming a light-shielding pattern on the top surface of the upper substrate, wherein
    the first black matrix for the display area and the second black matrix for the non-display area are a same layer, and are formed of a same material, wherein
    the light-shielding pattern overlaps the second black matrix, and wherein the light-shielding pattern is adjacent to at least one of the plurality of sensing lines on a same plane, and is spaced apart from the at least one of the plurality of sensing lines on the same plane.

14. The method as claimed in claim 13, wherein, in the joining of the lower and upper substrates together, a laser is irradiated onto the sealing member from a direction of the upper substrate through the sealing area in which the black matrix is open.

15. The method as claimed in claim 13, wherein forming the light-shielding pattern on the top surface of the upper substrate includes covering the sealing area after the joining of the lower and upper substrates together is completed.

16. The method as claimed in claim 13, wherein, in the forming of the one or more of the sensing patterns and the sensing lines, the light-shielding pattern is formed on the top surface of the upper substrate to cover the sealing area.

17. The method as claimed in claim 16, wherein, in the forming of the one or more of the sensing patterns and the sensing lines, the light-shielding pattern is simultaneously formed with the sensing patterns and the sensing lines using a same material as a material used for the sensing patterns and the sensing lines.

18. The method as claimed in claim 13, further comprising performing a slimming process of the upper substrate after the joining of the lower and upper substrates and prior to the forming of the sensing patterns and the sensing lines on the top surface of the upper substrate.

19. The method as claimed in claim 13, further comprising forming a protection layer on the sensing patterns.

20. The method as claimed in claim 13, wherein the light-shielding pattern, the plurality of sensing lines, and the plurality of sensing patterns are formed directly on the top surface of the upper substrate.

21. The method as claimed in claim 20, wherein the black matrix is formed directly on the bottom surface of the upper substrate.

* * * * *